United States Patent Office 3,451,998
Patented June 24, 1969

---

3,451,998
NEUTRALIZING HYDROXYALKYL CELLULOSE
William J. Alexander, Whippany, Charles F. Murphy, Morristown, and Thomas E. McEniry, Jr., Wharton, N.J., assignors to ITT Rayonier Incorporated, New York, N.Y., a corporation of Delaware
No Drawing. Filed Dec. 28, 1965, Ser. No. 517,094
Int. Cl. C08b *11/20, 11/08*
U.S. Cl. 260—231                3 Claims

---

ABSTRACT OF THE DISCLOSURE

Fibrous hydroxyalkyl cellulose (for convenience called HAC) is produced by etherifying moist fibrous alkali cellulose with gaseous alkylene oxide in the presence of sodium hydroxide as a catalyst. Residual sodium hydroxide catalyst in the resultant moist hydroxyalkyl cellulose crumb is neutralized with sulfur dioxide gas to convert the sodium hydroxide to sodium sulfite or sodium bisulfite which is then washed from the crumb to obtain a purified HAC product.

---

The invention is concerned only with hydroxyalkyl cellulose in which the alkyl group has 2, 3 or 4 carbon atoms, and it is to be understood that the HAC referred to herein is so restricted.

In many commercial processes for the production of HAC, a moist, fibrous alkali cellulose is etherified with a gaseous alkylene oxide having 2, 3 or 4 carbon atoms in the presence of a substantial amount of sodium hydroxide. Since the sodium hydroxide acts only as a catalyst during the etherification it carries over into the product as a contaminant. HAC being sensitive to caustic solutions, removal of this sodium hydroxide during purification without gelation, swelling and substantial loss of the fibrous HAC presents a difficult and serious problem.

The present practices for neutralizing the sodium hydroxide in HAC include use of acid followed by washing; extraction of the sodium hydroxide with an organic solvent, dialysis, and reaction of the sodium hydroxide with carbon dioxide to form sodium carbonate which is left in the HAC. These practices effect neutralization but each has its own disadvantages: organic solvents are expensive, acid causes loss through swelling and solution, and dialysis is slow and expensive. The neutralizing with carbon dioxide to form sodium carbonate which is left in the HAC does not achieve the production of a purified product.

The process of this invention comprises treating a moist, fibrous HAC crumb containing residual sodium hydroxide catalyst, in the substantial absence of free liquid, with gaseous sulfur dioxide until the sodium hydroxide is converted to sodium sulfite which is washed out of the HAC with water. The process of the invention gives a purified fibrous HAC with an absolute minimum of fiber swelling, gelation and solution. Moreover, the sodium sulfite is an easily recovered and useful by-product.

Because of present commercial advantages, the invention is especially applicable to the treatment of hydroxyethylcellulose (HEC) and will be described in detail with reference to this product. The invention is particularly concerned with the treatment of HEC having from 3 to 14 percent, preferably from 8 to 10 percent of substituted ethylene oxide.

Sensitivity to swelling and solubility in dilute alkaline solutions increases sharply with the level of alkoxyl substitution. Gaseous sulfur dioxide ($SO_2$) neutralization of aged and reacted HEC crumb gave a materially improved product yield, based on air dry pulp compared with the product yield obtained using aqueous acid neutralization. At an ethylene oxide substitution level of 10% the yield with $SO_2$ neutralization was increased 20 percent over aqueous acid neutralization. At the 8% substitution level, an 11% increase in product yield was obtained using $SO_2$ neutralization. The primary swelling of fibrous product having 10% substitution was reduced at least 50%. At the 4% ethylene oxide substitution level the increase in yield was only 5%. The product yield of $SO_2$ neutralized 8% substituted HEC was equal to the product yield of 4% substituted HEC neutralized with aqueous acid.

The following examples illustrate the process of the invention:

EXAMPLE 1

Fibrous samples of HEC for experimental purification procedures having ethoxyl contents of 4 and 8 percent respectively were prepared as follows:

A sample of commercial, dissolving-grade, bleached, southern pine, sulfite wood pulp was steeped for 30 minutes at 30° C. with 18 percent hemi-free sodium hydroxide. It was then pressed at a ratio of 2.7 and shredded for 30 minutes. The alkali cellulose crumb thus formed was divided into two portions. One portion was etherified with sufficient gaseous ethylene oxide to form a product having 4 percent ethoxyl. The other was etherified with sufficient gaseous ethylene oxide to form a product having 8 percent ethoxyl. Etherification in both cases was in churn-type equipment for a period of two hours at 40° C. One hundred gram samples of the foregoing HEC crumb products were then purified by either neutralization of the alkali with aqueous acid or gaseous sulfur dioxide, washed and dried and the yields of purified product determined.

Aqueous acid

In the case where purification was with aqueous acid the 100-gram HEC crumb sample was slowly added to a well agitated aqueous bath containing sufficient dilute acetic acid to neutralize the alkali (checked with pH paper). The HEC was then filtered out on a Buchner funnel with refiltration of the wash water to recover fines, and dried overnight at 50° C. in a vacuum oven.

Gaseous $SO_2$

In the case where the purification was accomplished with gaseous $SO_2$ the alkali in the HEC crumb was neutralized with the gaseous $SO_2$ in a stainless steel container. The neutralized sample was then washed sulfite free with water and dried overnight as before at 50° C. in a vacuum oven.

The yields of purified neutral HEC obtained are shown in Table I.

TABLE I

| Ethoxyl Substitution, percent | Type of purification | Product yield, percent |
|---|---|---|
| 4 | Aqueous acid | 95.2 |
| 4 | Gaseous $SO_2$ | 100 |
| 8 | Aqueous acid | 84.8 |
| 8 | Gaseous $SO_2$ | 95.2 |

Substantial quantities of HEC are produced commercially at ethoxyl substitution levels of 8 to 10 percent. To demonstrate the benefits to be expected from application of the process of the invention at the 10 percent substitution level, a sample of commercial dissolving-grade, southern pine, bleached sulfite pulp was steeped for 30 minutes at 30° C., in 18.5 percent hemi-free sodium hydroxide. After pressing to a ratio of 2.7, the alkali cellulose was then shredded for 30 minutes in a Baker Perkins shredder and etherified for 2 hours at 40° C. with gaseous ethylene oxide in churn-type apparatus. The crumb product was aged for 24 hours at room temperature and found to have an ethoxyl content of 9.9 percent. Duplicate samples of the same were purified by the following methods and dried.

Gaseous SO₂

One-hundred gram portions of the etherified crumb were placed in a four-liter stainless steel vessel and charged with SO₂ gas until the consumption of the same ceased. The so-neutralized product was then transferred to a Buchner funnel, washed salt free with hot water and dried.

Aqueous acid

One-hundred grams of the reacted crumb were sifted into 3000 mls. of five percent sulfuric acid at 50° C., and agitated for 3 minutes with an air driven Cowles type mixer blade. The neutralized product was then transferred to a Buchner funnel, washed salt free with hot water and dried as in the previous sample. Primary swelling of the purified fiber was also determined in each case. The results are shown in Table II.

TABLE II

| Type of purification | Product yield, percent | Primary crumb swelling, percent |
|---|---|---|
| Gaseous SO₂ | 85.2 | 225 |
| Aqueous acid | 63.4 | 570 |

NOTE.—The sample neutralized with aqueous acid was so highly swollen that it lost its fibrous state. It drained very slowly and was difficult to wash.

EXAMPLE 2

Further portions of woodpulp were etherified to ethoxyl substitution levels of 12 and 15 percent by methods similar to those used in Example 1. At 12 percent, the transition point is reached where water solubility importantly effects overall yield and at 15 percent only solvent purification is really practical. At 12 percent substitution level for ethoxyl gaseous SO₂ purification still gives an advantage in yield over 20 percent while the advantage decreases somewhat at 15 percent. The HEC samples were prepared and purified as follows:

A sample of dissolving-grade, bleached southern pine sulfite wood pulp was steeped for 30 minutes at 30° C. in 18.5 percent hemi-free sodium hydroxide. After pressing to a ratio of 2.7, it was then shredded for 30 minutes in a Baker Perkins shredder. Etherification in churn-type equipment was for 3 hours at 40° C. with gaseous ethylene oxide after which each sample was aged for one hour at room temperature before purification. Neutralizing and washing were as follows:

Gaseous SO₂

Two-hundred gram samples of the etherified crumb at both the 12 and 15 percent substitution levels were placed in a 4-liter stainless steel vessel. The vessel was then evacuated and SO₂ gas admitted until consumption of the same stopped. The vessel was then opened and the product transferred to a Buchner funnel, washed salt free with hot water and dried.

Aqueous acid

One-hundred gram samples of the etherified crumb at both the 12 and 15 percent substitution levels were added to 1500 mls. of 50° C. water containing 20 mls. of concentrated sulfuric acid. After agitation for 3 minutes the product was dewatered on a 100 mesh screen, washed with hot water and dried as in the preceding case. Primary swelling was obtained for the products at the 12 percent substitution level but at the 15 percent level the water sensitivity of the product was too high for useful results to be obtained. The results obtained follow in Table III.

TABLE III

| Type of purification | Ethoxyl content, percent | Product yield, percent | Primary swelling, percent |
|---|---|---|---|
| Gaseous SO₂ | 12.4 | 67.0 | 339 |
| Aqueous acid | 11.9 | 42.1 | 990 |
| Gaseous SO₂ | 14.6 | 16.8 | |
| Aqueous acid | 14.6 | 2.2 | |

In neutralizing the sodium hydroxide residual catalyst with sulfur dioxide according to this invention the resulting salt may be sodium sulfite or sodium bisulfite, or mixtures thereof, depending on the concentrations of sodium hydroxide and sulfur dioxide.

We claim:

1. In the process for producing fibrous hydroxyalkyl cellulose having an alkoxyl substitution of 3 to 14 percent in which the alkyl group has 2, 3, or 4 carbon atoms by etherifying moist, fibrous alkali cellulose with gaseous alkylene oxide in the presence of sodium hydroxide catalyst, the improvement which comprises treating the resulting moist hydroxyalkyl cellulose crumb containing residual sodium hydroxide catalyst in the substantial absence of free liquid with sulfur dioxide gas until the sodium hydroxide is converted to sodium sulfite or sodium bisulfite and then washing the sodium sulfite or sodium bisulfite out of the crumb with water whereby a purified fibrous hydroxyalkyl cellulose product is obtained.

2. The process as defined in claim 1 in which the fibrous hydroxyalkyl cellulose is hydroxyethyl cellulose.

3. The process as defined in claim 2 in which the ethylene oxide substitution is from 8 to 10 percent.

References Cited

UNITED STATES PATENTS 2,103,639   12/1937   Richter _____ 260—232

DONALD E. CZAJA, *Primary Examiner.*

R. W. MULCAHY, *Assistant Examiner.*